United States Patent [19]

Schmittbetz et al.

[11] 4,344,334
[45] Aug. 17, 1982

[54] CHANGE-SPEED TRANSMISSION WITH SPEED-RANGE SELECTION MEANS FOR MOTOR VEHICLES, PARTICULARLY FOR FARM TRACTORS

[75] Inventors: Klaus Schmittbetz, Cologne; Karl D. S. Struchtrup, Kettwig, both of Fed. Rep. of Germany

[73] Assignee: International Harvester Co., Chicago, Ill.

[21] Appl. No.: 185,861

[22] Filed: Sep. 11, 1980

[51] Int. Cl.³ ............................................. G05G 9/12
[52] U.S. Cl. ................................... 74/473 R; 74/475
[58] Field of Search ................... 74/473 R, 475, 477

[56] References Cited

U.S. PATENT DOCUMENTS 3,513,717 5/1970 Lickey et al. .................. 74/475 X
3,975,970 8/1976 Elfes et al. ...................... 74/473 R

*Primary Examiner*—Allan D. Herrmann
*Attorney, Agent, or Firm*—B. Parad; F. D. AuBuchon

[57] ABSTRACT

A gear-shift mechanism for a motor vehicle having a change-speed transmission equipped with a speed-range selection device. The mechanism has a multi-speed gear-shift transmission unit and a range-shift transmission unit. The mechanism incorporates a shift control level whose movement can be transferred via a gear-selector passage and via several gear-shift passages to a gear-shaft which is supported in a rotating manner and can be axially moved inside a housing. The shaft loosely supports gear shifting levers which can be engaged on the shaft and locked in position in a non-revolving manner after an axial movement of the gear-shift shaft caused by the respective gear-selecting operations of the shift-control lever. The arrangement being characterized in that for the purpose of establishing a non-revolving engagement of the gear-shift transmission unit's shifter levers (13, 14) on the shifting shaft (27), the latter is provided with two engaging members (28, 29) arranged at an axial distance to each other and alternatively moved into an operating connection with the shifter levers (13, 14). The arrangement further characterized in that the range-shift transmission unit can be operated by a shifting mechanism (40) which is controlled by an axially moveable shift finger (37). The finger (37) is loosely connected to the shifting shaft (27) in the direction of rotation and is in a fixed connection with the shifting shaft (27) in an axial direction.

11 Claims, 9 Drawing Figures

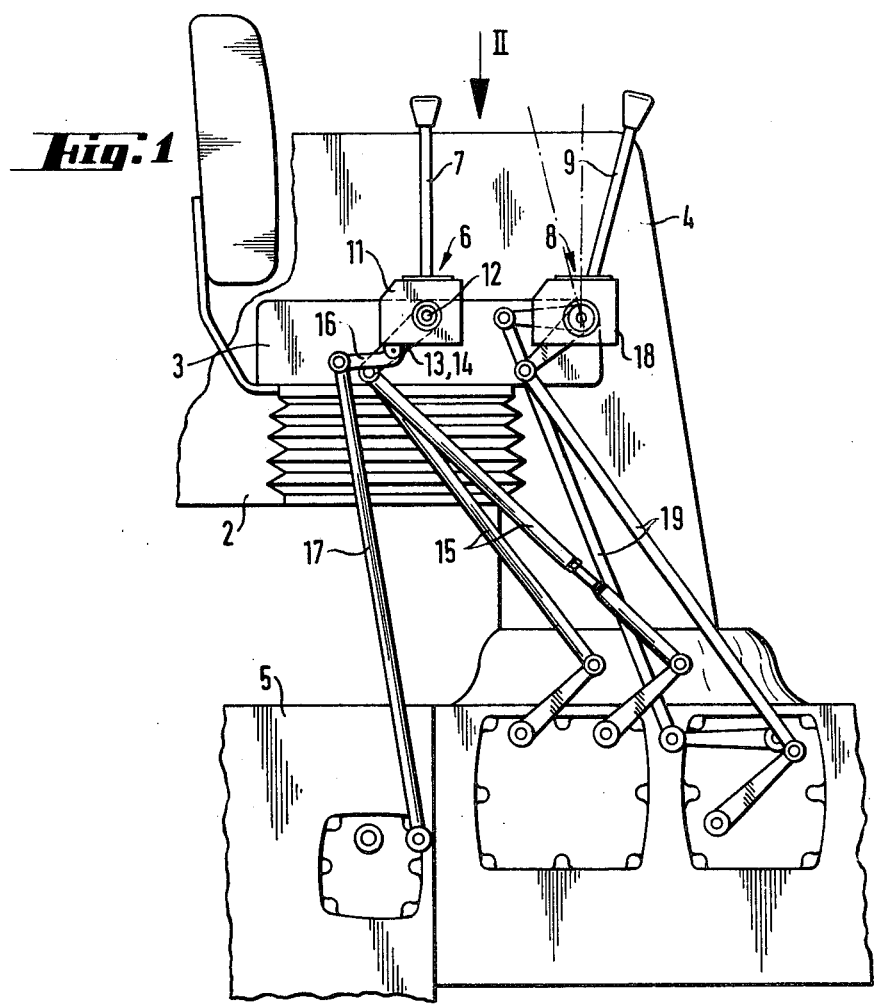
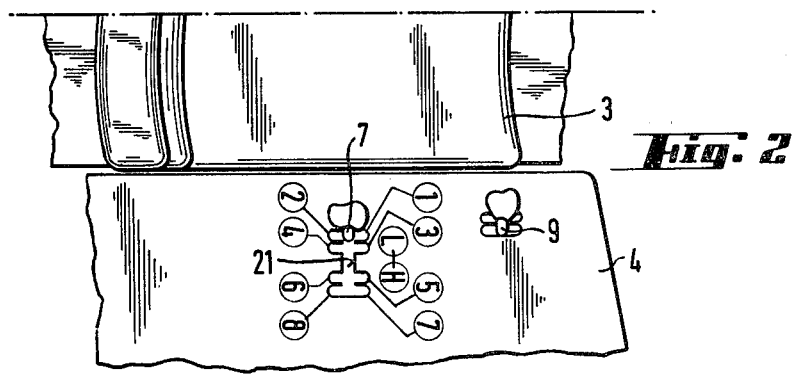

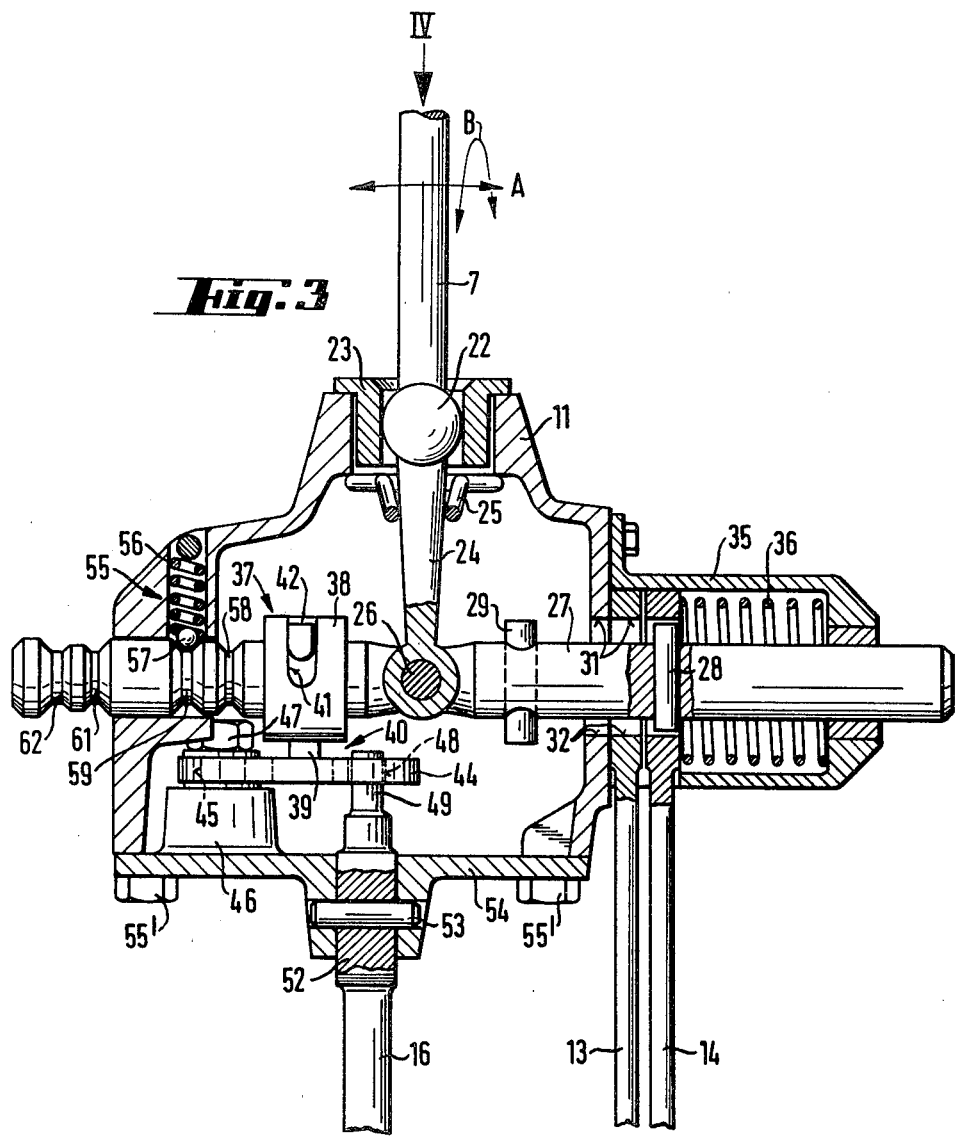

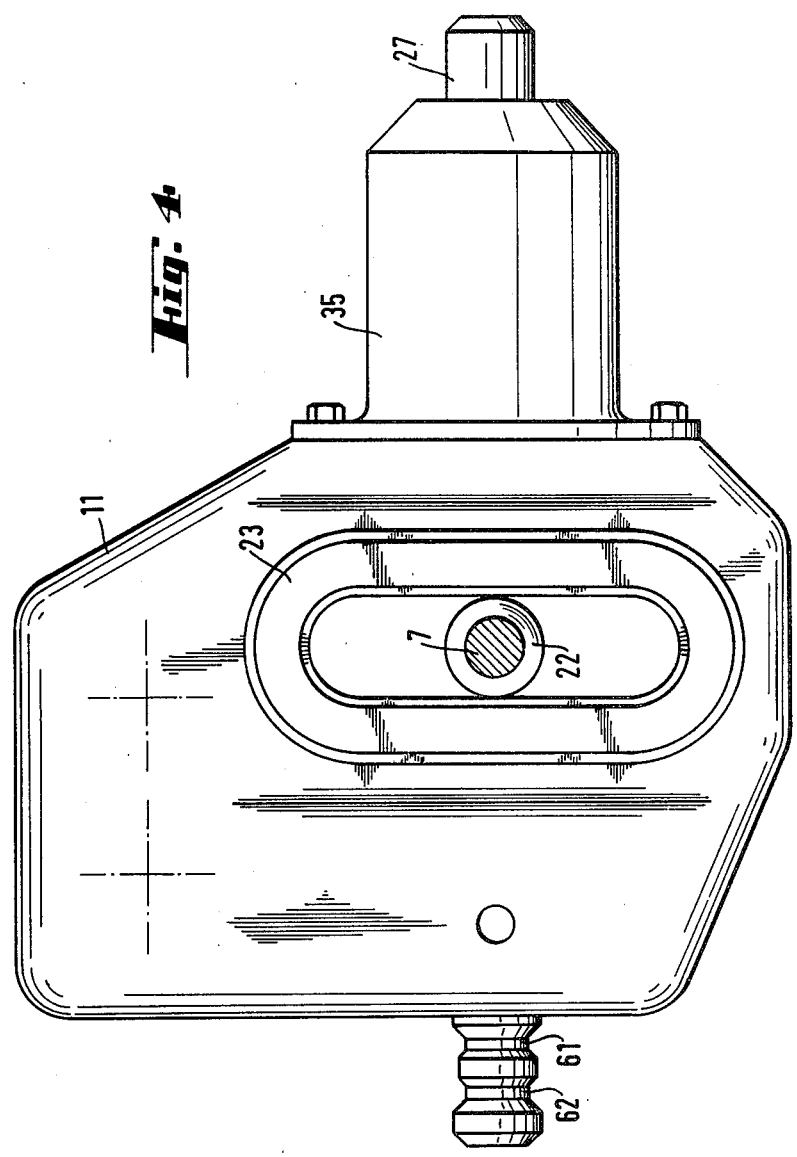

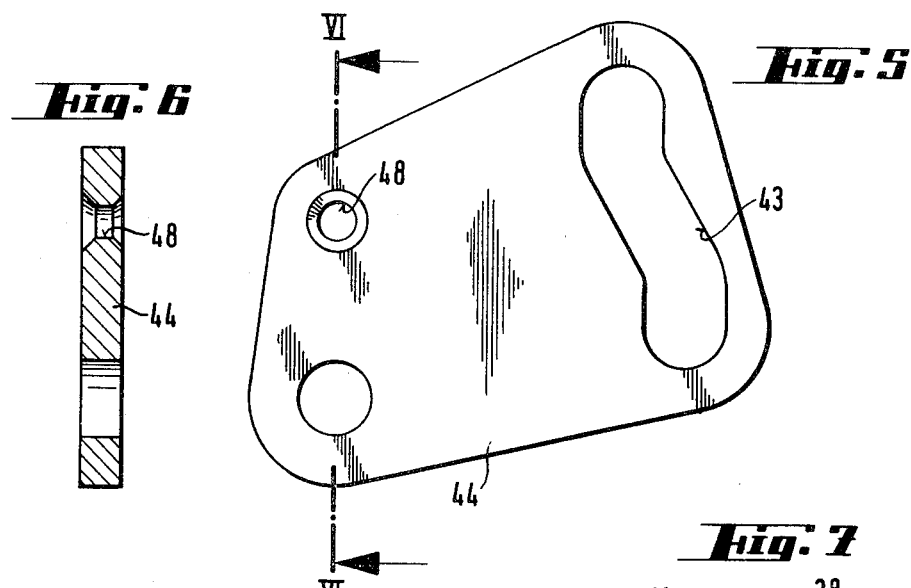
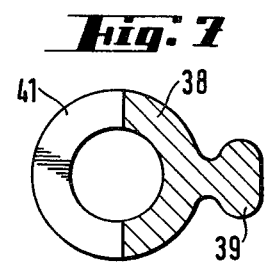
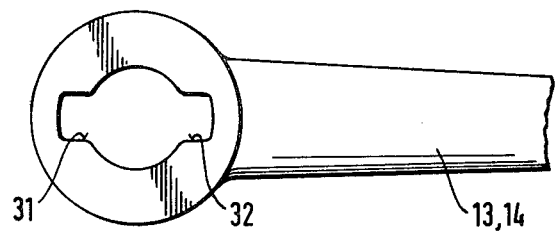
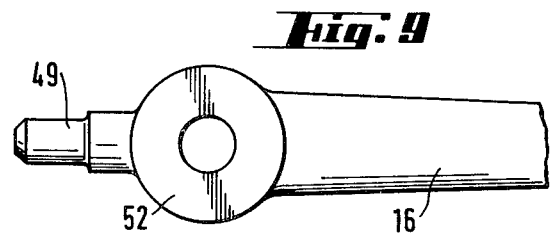

CHANGE-SPEED TRANSMISSION WITH SPEED-RANGE SELECTION MEANS FOR MOTOR VEHICLES, PARTICULARLY FOR FARM TRACTORS

The invention relates to a gear-shift mechanism for a change-speed transmission equipped with speed-range selection means for motor vehicles, particularly for use on farm tractors, having a multi-speed gear-shift transmission unit and a range-shift transmission unit; assigned thereto a shift control lever, the movements of which can be transferred via a gear-selector passage and via several gear-shift passages to a gear-shift shaft which is supported in a rotating manner and can be axially moved inside a housing, whereby on said shaft gear-shifting levers are loosely supported which—following an axial movement of the gear-shift shaft caused by the respective gear-selecting operation of the gear-shift lever—can be engaged on said gear-shift shaft and locked in position in a non-rotating manner.

A gear-shift mechanism of the initially described design became known by the German Disclosure DOS No. 14 80 723. This design features a change-speed transmission unit as main transmission which comprises an input range, an output range and a range-shift transmission unit. To shift the shifting members of the main transmission's output range and to shift the shifting member of the auxiliary range-shift transmission unit, power-assisted (servo) units are provided which are controlled by the shifting movements of the gear-selector control. The gear-shift mechanism operates as follows: to change the output range of the main transmission or the appertaining servo unit respectively the gear-selector control is moved in vertical direction to the shifting passages extending along the vehicle's direction of travel; whereas, to change the range-transmission unit the gear-selector control is moved upward sloping to a longitudinal centre plane. The range-selecting and gear-shifting movements correspond with the known H-type shifting pattern of a gate change system, which is passed once each in two superposed planes. To facilitate these selecting and shifting movements and to facilitate their transferring onto the gear-shift and the range-shift transmission unit resp., extensive designwise expenditure is required; e.g. the gear-selector control is linked to the shifting shaft by means of an additional shift rod, an arrangement requiring a fixed supporting of the shift rod which—in this case—is effected by providing on the shift rod an angle member and an additional control rod.

Furthermore, for the change-over of the range-transmission unit's servo-valve articulation means for a second shaft are required at the bottom end of the selector control, whereby a control rod is used to contact said shaft with the range-transmission unit's servo-valve. It is also absolutely essential for the shifting shaft to be arranged laterally offset (displaced) to the selector control in order to facilitate the required transferring of movements onto the transmission members.

Thus the known shifting mechanism is of a rather intricate as well as expensive design. It requires a multitude of components, the number of which alone impairs the design's reliability, leads to early wear, and—consequently—to the gear-shift mechanism's failure. The considerable space required by the gear-shiaft mechanism's layout must be considered a particular disadvantage.

This invention is based on the objective of providing a gear-shifting mechanism of the initially described design, the layout of which is straight forward, economical and space-saving; features which are of particular importance with a planned installation on farm tractors, where—generally—the available space is rather limited.

Furthermore, the mechanism is to be laid out for easy and sensible operation, and it is to have as few components as possible, thus guaranteeing a long service life. According to this invention the problem is solved by providing, for the purpose of engaging the gear-shift transmission unit's shifter lever in a non-rotating manner on the shifting shaft, said shifting shaft with two engaging elements arranged at an axial distance to each other and alternately moved into an operating connection with the shifter levers; and by designing the range-shift transmission unit to be operated by a change (shift) mechanism controlled by an axially moveable shift finger which is loosely connected to the shifting shaft in the direction of rotation and which is in fixed connection with said shifting shaft in axial direction. By applying the design means specified in this invention, a gear-shifting mechanism is provided on which in a very simple manner the lateral movement of the gear selector control in the selector gate is directly used to shift the range transmission (auxiliary range). One of the engaging elements on the shifting shaft transducers the power to the shifter levers of the speed-gear transmission unit, while the other engaging element completes the same operation after the range-shift transmission unit has been shifted. By this arrangement it is possible to use the shifter lever for two separate operations. The shifting mechanism described in subject invention is superior by requiring a few components only which can be accommodated in a limited space. Thus a compact gear-shift mechanism is provided which is suited for installation in the limited space available on a motor vehicle.

An expedient embodiment of the invention shows the engaging elements to comprise tripping pins which engage in diametrically opposite recesses provided in the shifter levers. In a very simple manner this arrangement guarantees the dual utilization of the shifter levers since after changing the range and the speed-gear transmission in each case the second trip pin takes over from the first one. Laterally free the operative trip pin can then be guided through the shifter levers and only when the shifting shaft is turned, the operative trip pin can take up its respective operation.

Although engaging elements designed as trip pins which engage in diametrically opposite arranged recesses provided in shifter levers are already prior art, e.g. as specified in DE-OS No. 20 63 371, this design features only one trip pin on the shifting shaft, and it is used in the conventional manner to shift the individual shifter levers of the range-shift transmission unit. A dual utilization of the shifter lever to operate the speed-gear transmission unit on the one hand and to operate the range-shift transmission unit on the other hand is not intended.

A further embodiment of the invention shows the shifting mechanism to have a gate plate supported in a unidirectionally revolving manner, whereby said gate plate has been provided with a slot to receive the free end of the shift finger and with a receiving bore for a pin-shaped end section of the range-shift transmission unit's shifter lever. By employing a servo-unit the utilization of this purely mechanical shifting mechanism can easily be improved upon. Basically, it is also possible to use a power shift unit in which case the shift finger, the gate plate, and the shifter lever of the range-shift transmission unit are substituted by a correspondingly adapted shift-finger which passes over the contact plate and triggers the shifting operation.

Conductive to the compact design of the gear-shift mechanism is the arranging of the gate plate in a plane extending below the shifting shaft, supported in a pivoting manner on a bearing boss provided on a cover of the housing. Such an arrangement simplifies both the assembly and the dismantling of the shifting mechanism considerably.

Since the arresting of the shifter forks for the speed-gear transmission and the range-selecting transmission is effected in the transmission itself, without requiring any additional resources it is possible to use this shifting mechanism together with an operator's platform (or body platform or cabin, etc.) which is flexibly mounted on the vehicle body.

More advantageous embodiments of the invention can be taken from the characteristic features detailed in the subclaims.

A preferred embodiment of the invention is shown in the drawings and described in detail in the following text.

FIG. 1 shows the side view of an operator's platform and a section of a farm tractor featuring the gearshift mechanism described in subject invention;

FIG. 2 shows part of the appertaining top view;

FIG. 3 shows a longitudinal section through the gear-shift mechanism;

FIG. 4 shows the pertinent top view on the gearshift mechanism;

FIG. 5 shows a top view of the gate plate of the shifting mechanism;

FIG. 6 shows the section VI—VI of FIG. 5; and

FIGS. 7 through 9 show further detail features of the gear-shift mechanism.

FIG. 1 shows the operator's platform 1 of a motor vehicle, e.g. a farm tractor, of which mainly the platform 2, the operator's seat 3, and a console 4 are displayed. Underneath the platform 2 a drive means 5 comprising a change-speed transmission unit is accommodated which, however, is not shown in detail.

To operate the change-speed transmission a gear-shift mechanism 6 with a gear-selector control 7 is provided; there is a second gear-shift mechanism 8 which also has a gear-selector control 9. The gear-selector control 7 is a combined (dual-purpose) lever serving both a range-shift transmission unit and a gear-shift transmission unit of the change-shift transmission. For this purpose the first gear selector control 7 is supported in a housing 11 which also accommodates a shifting shaft 12 on which shifter levers 13, 14 (described in detail later on) are loosely supported. By means of a control linkage 15 said shifter levers 13, 14 are used to operate the gear-shift transmission unit (an operation not detailed in subject specification). In the housing 11 a second shifter lever 16 is supported in a swivelling arrangement. By means of a control linkage 17 it serves to operate the range-shift transmission unit.

A second gear selector lever 9 has a similar housing 18 and also a control linkage 19 which serves to shift from forward to reverse travel, but also to engage a creep gear or an auxiliary range transmission unit. Since the a/m shifting operations make up one H-pattern only, the fourth position is not required, or it can be used to repeat the forward position so that only one linear movement is completed when changing from forward to reverse and from the auxiliary range transmission unit to forward travel.

FIG. 2 shows the H-type gear-shift pattern of the second gear-selector control 9. It also shows the double H-type pattern of the first gear-selector control 7, where the one H-type gate facilitates the engaging of the initial four gears, and the second H-type gate allows the engaging of the gears 5 through 8. When moving through the gear-selector passage 21, between the passages for 3rd, 4th and 5th, 6th gear it is also possible to change the range-shift transmission unit from a lower to a higher ratio, e.g. on a farm tractor from a field range to a road range.

FIG. 3 shows that by means of a ball member 22 the first gear selector control 7 can be moved along a shifting gate 23 in the directions indicated by the double arrow 'A' as well as across in the directions indicated by the double arrow 'B'. The shifting gate 23 is located in the first housing 11; by means of an extension 24 the gear-selector control 7 is supported by a conical spring 25 which normally holds said control 7 in its neutral position (shifting movement in the direction indicated by the double arrow B). At the bottom end of the extension 24 a pin 26 is used to connect the gear-selector control 7 to a gear-shift lever shaft 27. By this arrangement it is possible to move the shifting shaft 27 in axial direction and to have it complete a radial rotary movement. On the shifting shaft 27 two coupling elements are provided which are designed as trip pins 28, 29 arranged at an axial distance to each other. These trip pins 28, 29 can engage in recesses 31, 32 arranged diametrically opposite on the shifter levers 13, 14, whereby said trip pins 28, 29 can be guided freely in axial direction through the shifter levers 13, 14 onto which they only act if the shifting shaft 27 is revolved. The one shifter lever 13 serves to engage the first and second as well as the fifth and the sixth gear, while the other shifter lever 14 serves to engage the third and the fourth as well as the seventh and the eighth gear, as will be explained in detail later on. Inside a flanged housing 35 connected to the one housing 11 a compression spring 36 rests against the shifter lever 14. Said compression spring 36 is supported inside the flanged housing 35 and it encircles the shifting shaft 27.

On the side opposite the trip pins 28, 29 a shift finger 37 is provided on the shifting shaft 27. Said shift finger 37 has a guide head 39 and a sleeve member 38 which is supported on the shifting shaft 27 and which can perform a limited revolving movement around said shaft.

FIG. 7 shows that the shift finger 37 has been provided with a centre groove 41 which extends along part of the sleeve member's 38 circumference. FIG. 3 shows that into said groove 41 a pin 42 projects which has been provided on the shifting shaft 27. This arrangement guarantees that although the shift finger 37 is arranged on the shifting shaft 27 in a manner allowing a limited rotary movement, it cannot be moved on said shaft in axial direction. With its guide head 39 the shift finger 37 engages in an almost curve-like longitudinal slot 43 provided in a gate plate 44 detailed in the FIGS. 5 and 6. A journal 45 is used to support the gate plate 44 on a bearing boss 46 in a pivoting manner; it is secured by means of a unit 47 or any other securing means. The gate plate 44 has also been provided with a receiving bore 48 for the pin-type end section 49 of the shifter lever 16 which serves to operate the range-shift transmission unit. The shifter lever 16 (again shown in FIG.

9) features a hub section 52 which is used to support said shifter lever 16 in a swivelling manner on a shaft 53 extending parallel to the shifting shaft 27. Said shaft 53 being accommodated inside a cover 54 which—by means of bolts 50—is connected to the housing 11 in a detachable manner.

The shifting shaft 27 is provided with an arresting (locking) means 55 comprising a compression spring 56, a stop ball 57, and annular grooves 58, 59, 61, 62 machined into the shifting shaft. By providing the above arrangement it is possible to arrest the shifting shaft 27 (corresponding to its axial shifting positions) in the respective shifting position in has been moved into. By giving the bridges between the annular grooves different diameters a changing of speed gears within the H-pattern 1, 2–3, 4 and 5, 6–7, 8 resp. can be completed easier than a changing of the speed range.

The operating characteristics of the shifting mechanism according to subject invention are now going to be explained:

In the position shown in FIG. 3 the gear-selector control 7 is in its neutral position. The trip pin 28 is positioned at the shifter lever 14. Provided the gear-selector control 7 is moved in either the one or the other direction indicated by the double arrow B, either the third or the fourth gear of the speed-gear transmission can be engaged. If the first or the second gear are to be engaged, the gear-selector control 7 will have to be moved from its shown position by following the double-arrow A indication to the right, thereby moving the shifting shaft 27 to the left up to the point where the trip pin 28 catches in the recesses 31, 32 provided in the other shifter lever 13. In the course of the above operation the stop ball 57 moves into the first annular groove 58. By operating the gear-selector control 7 along the shifting passages, i.e. in the directions indicated by the double-arrow B, either the first or the second gear of the gear-shift transmission unit can be engaged. The range-shift transmission unit of the change-speed transmission is in either the high or the low-range position. Now, if the range is to be changed, the gear-selector control 7 has to be moved by a certain distance in the direction indicated by the double-arrow A up to the point where the other trip pin 29 catches in the recesses 31, 32 of either the shifter lever 13 or the shifter lever 14. According to the respective position either the fifth and sixth or the seventh and eighth gear of the change-speed transmission can be engaged. Simultaneously with this axial movement of the shifting shaft 27 the gate plate 43, too, is moved by the shift finger 37. Consequently, by means of the pin-type end section 49 the range-shift transmission's shifter lever 16 is turned correspondingly on the supporting shaft 53 and is thereby moved to the alternative position the range-shift transmission can take up.

By means of the arresting device 55 the shifting shaft 27 and, together with it, the gear-selector control 7 are locked in their respective positions so that an inadvertent shifting is not possible.

Basically, it is also possible to dispense with the pressure spring 36.

What is claimed is:

1. A gear-shift mechanism for a change-speed transmission equipped with speed-range selection means for motor vehicles, said mechanism (6) comprising: a multi-speed gear-shift transmission unit and a range-shift transmission unit; a shift control lever (7) actuating via a gear-selector passage (21) and via several gear-shift passages a gear-shift shaft (27) rotatively supported and axially moveable inside a housing (11); gear-shift levers (13, 14) loosely supported on said shaft and lockable in a non-revolving manner; said gear-shift shaft (27) including two coupling elements (28, 29) co-axially and spatially disposed thereon and alternately moveable into a non-revolving engagement with said gear-shift levers (13, 14); said range-shift transmission unit being operated by a shifting mechanism (40) controlled by a shift finger (37) mounted on and axially moveable together with said gear-shift shaft; and said finger limitedly rotating about said gear-shift shaft (27) and axially immobile relative thereto.

2. The gear-shift mechanism according to claim 1, wherein said coupling elements comprise trip pins (28, 29) displaceable into recesses (31, 32) positioned diametrically opposite in said gear-shift levers (13, 14).

3. The gear-shift mechanism according to claim 1, wherein said shifting mechanism (40) has a revolvingly supported gate plate (44) comprising a slot (43) adapted to receive a free end (39) of said shift finger (37) and a receiving bore (48) for a pin-shaped end section (49) of a shifter lever (16) of the range-shift transmission.

4. The gear-shift mechanism according to claim 3, wherein said gate plate (44) is located in a plane extending below said gear-shift shaft (27) and pivotally supported by a bearing boss (46) provided on a cover (54) of the housing (11).

5. The gear-shift mechanism according to claim 3, wherein said pin-shaped end section (49) engages from below said receiving bore (48) provided in said gate plate (44).

6. The gear-shift mechanism according to claim 3, wherein a hub section (52) of said shifter lever (16) is supported in a revolving arrangement on a bearing shaft (53) extending parallel to said gear-shift shaft (27) and being located in a detachable cover (54) of said housing (11).

7. The gear-shift mechanism according to claim 3, wherein said shift finger (37) has a sleeve member (38) supported on said gear-shift shaft (27) in a revolving arrangement; said shift finger having a guide head (39) projecting radially outwardly from said sleeve member (38) and moveable within said slot (43) of said gate plate (44); and said slot having a curvilinear configuration.

8. The gear-shift mechanism according to claim 7, wherein said sleeve member (38) has a centre groove (41) extending along a part of the sleeve's circumference; and said gear-shift shaft (27) comprising a pin (42) moveable within the boundries of said centre groove (41).

9. The gear-shift mechanism according to claim 1, wherein said gear-shift shaft (27) has arresting means (55) holding it locked in gear-engaged positions.

10. The gear-shift mechanism according to claim 1, and a pressure spring (36) encompassing said gear-shift shaft (27) and urging said gear-shift levers (13, 14) to move axially along said shaft; and said pressure spring (36) supported inside a flanged housing (35) connected to said housing (11).

11. The gear-shift mechanism according to claim 10, and said pressure spring (36) comprising compression springs.

* * * * *